United States Patent [19]
Gasper

[11] Patent Number: 5,894,365
[45] Date of Patent: Apr. 13, 1999

[54] COLLAPSIBLE VIEWER HAVING AN INTEGRAL REFLECTION PRINT

[75] Inventor: John Gasper, Hilton, N.Y.

[73] Assignee: Eastman Kokak Company, Rochester, N.Y.

[21] Appl. No.: 08/979,516

[22] Filed: Nov. 26, 1997

[51] Int. Cl.$^6$ .................................................. G02B 27/22
[52] U.S. Cl. ................................................ 359/474; 359/408
[58] Field of Search ................................ 359/408, 466, 359/471, 472, 474, 480, 482

[56] References Cited

U.S. PATENT DOCUMENTS

| | | |
|---|---|---|
| 2,789,460 | 4/1957 | Kaufman . |
| 3,734,596 | 5/1973 | Nerlich ................................ 359/474 |
| 3,756,699 | 9/1973 | Martin . |
| 4,175,828 | 11/1979 | Carver . |
| 4,235,514 | 11/1980 | Carver . |
| 4,253,732 | 3/1981 | Carver . |
| 4,357,073 | 11/1982 | Carver . |
| 4,846,553 | 7/1989 | Rice . |
| 5,000,543 | 3/1991 | Curtin . |
| 5,058,991 | 10/1991 | Curtin . |
| 5,136,423 | 8/1992 | Curtin . |

*Primary Examiner*—Cassandra Spyrou
*Assistant Examiner*—Craig H. Curtis
*Attorney, Agent, or Firm*—Susan L. Parulski

[57] ABSTRACT

A viewer having a collapsed condition and a viewing condition. The viewer includes a front and rear wall formed of a flexible material and joined together at their top and bottom edges. The front wall includes a pair of images disposed on the interior surface of the front wall, while the exterior surface includes a reflection print. The rear wall includes a pair of viewing apertures having lenses in optical registration with the pair of images. A middle wall is disposed intermediate the front and rear walls and is joined together with the rear wall at their bottom edges. The middle wall includes at least one aperture in optical registration with the pair of images. The front and rear walls move between the viewing condition wherein the front and rear walls flex to define convex curves and the pair of images are viewable through the pair of viewing apertures, and the collapsed condition wherein the interior surfaces of the front and rear walls abut the middle wall.

17 Claims, 7 Drawing Sheets

COLLAPSIBLE VIEWER HAVING AN INTEGRAL REFLECTION PRINT

FIELD OF THE INVENTION

The invention relates generally to the field of photography, and in particular to a collapsible viewer. More specifically, invention provides a reflection print with an integral viewer which can be collapsed to a thin form. The viewer permits the reflection print's image to be viewed directly and also viewed with improved perspective. The viewer is particularly suited for viewing the image in stereo.

BACKGROUND OF THE INVENTION

Collapsible viewers are well known devices in the art that have been constructed in various shapes and sizes with varying complexity. Some inexpensive viewers are made from rigid or semi-rigid materials such as cardboard or paperboard. Such viewers usually include a pair of optical lenses aligned with and at the proper distance from a pair of stereoscopic images on transparent material (such as slides or film strips) or on opaque material (such as reflection prints). A user holds the viewer up to a light source to allow the light source to illuminate the image to enable seeing a stereo image. The stereoscopic images take on a three-dimensional appearance when the user views them through the optical lenses. Viewing the images through optical lenses provides a level of magnification that is greater than direct (i.e., unaided) viewing of standard-sized reflection prints at a standard viewing distance, thereby providing a more natural viewing perspective that adds realism to the image.

U.S. Pat. No. 4,253,732 relates to a viewer used for viewing several stereo pairs sequentially mounted in the viewer. However, the transparent images or miniature reflection prints utilized in such viewers are of such a small size that they do not allow acceptable direct viewing. Such a viewer does not provide for the viewing of standard-sized two-dimensional reflection prints of the image (for example, 3½×5 inch prints or 4×6 inch prints) for the purpose of screening those the user decides to view in stereo. Accordingly, a need continues to exist for a viewer which provides a user with a reflection print of a size comparable to the size of the collapsed viewer for the purpose of easily previewing the image and deciding whether to view it with the viewer to improve its perspective.

Prior art viewers have been constructed as foldable, box-type enclosures that a user must first assemble from a blank. Several U.S. patents, such as U.S. Pat. Nos. 3,734,596, 3,756,699, 4,357,073, 5,136,423, and 4,846,553, describe assembling collapsible stereo viewers from a precursor blank. When expanded, these box-type viewers provide for the surface of each image to be aligned flat and perpendicular to the optical axes of the lenses. There are problems, however, associated with these box-type viewers that have diminished their usefulness. Generally, box-type viewers are constructed from a single cardboard blank having numerous flaps and tabs that must be folded and placed in a proper sequence within appropriate slots that are also formed on the blank. Educating the user of how to properly assemble the viewer may require elaborate instructions. The design of most box-type viewers allows the viewer to be collapsed from the assembled or viewing position to a flattened position for storage. The procedure for collapsing the viewer usually requires performing the assembly steps in reverse. A viewer of complex design will require more elaborate assembly and disassembly steps than a viewer of simple design. Although the user of the viewer may accept this complexity and inconvenience of using the viewer in order to see many stereo images with the same viewer at one sitting, it is unlikely that the user would tolerate having to assemble a different viewer for each different image if the viewer only held one stereo image. Further, the thickness and number of walls or walls making up prior art viewers can also create a collapsed viewer with a thick profile that prevents the viewers from being used in certain applications. Also, although the viewers are collapsible after use, they may not lie perfectly flat but only flatten and remain flattened by a constant compressive force. If the compressive force is removed, the collapsible viewer tends to spring back to a less than truly flattened structure. For these reasons advertisers have refrained from using prior art viewers to advertise their products. Advertisers, greeting card manufacturers, and book publishers appear to be more willing to use collapsible viewers provided that the viewers are relatively inexpensive to manufacture, simple and convenient to use, collapsible to a truly flat profile, and still provide to the user a message or image while in collapsed form. Accordingly, a need continues to exist for a collapsible viewer which is relatively inexpensive to manufacture, simple and convenient to use, collapsible to a truly flat profile, and still provides to the user a message or image while in collapsed form.

SUMMARY OF THE INVENTION

The present invention provides a standard-sized reflection print with a simple, inexpensive, thin-walled, integral, and easily expandable binocular viewer that requires no assembly and can be used for consumer stereo or non-stereo photography, as well as for educational, entertainment, and advertising purposes. A standard-sized reflection print is provided with an integral and expandable but nonfoldable viewer having a profile that is flat when collapsed and is generally no thicker than the thickness of the three walls that form the viewer. The thin profile of the present invention permits the stacking of reflection prints to retain a small storage volume even though each reflection print has its own integral viewer. The present invention provides a simpler means for the user to view stereo or non-stereo images with improved viewing perspective and realism. Reflection prints can be easily distributed to the public such as by mail in a first class envelope, or used to create novel special occasion greeting cards, or provide inexpensive, but very effective, media for advertising promotions. When a user elects to use the viewer, he or she can quickly and easily expand the viewer to obtain a magnified view of the same image that is being presented in the reflection print for any of the above-mentioned purposes. The expansion of the viewer is simple, rapid, and intuitively obvious, thus not requiring reading assembly instructions or assembling the viewer by folding walls and fitting tabs into slots. The three walls of the expandable viewer are formed of naturally flat semi-rigid materials that resist curving and therefore provide a flat print when not expanded by the user. The print is expandable into a viewer an unlimited number of times, yet maintains its flatness when released.

The present invention provides a reflection print with an integral and expandable binocular viewer that is movable from a collapsed and flattened structure to an expanded and symmetrically bowed structure. The present invention is comprised of three walls with their surfaces nearly in contact in the collapsed form. A front and rear wall are joined at two of their opposed edges, while a middle wall is only joined at one of the same two opposed edges. The rear wall is preferably optically transparent or translucent and has, along a centerline dividing the width of the viewer from the opposed edges, a pair of lens-receiving openings and an optical lens affixed to each opening. An exterior surface of the front wall supports a reflection print. Affixed to an interior surface of the front wall are two miniature prints centered along a centerline dividing the width of the viewer. Left and right stereoscopic images may appear on these miniature prints, or the images may be identical for non-stereoscopic viewing. The miniature prints are centered with the pair of optical lenses affixed to the rear wall. The middle wall includes openings of nearly the same size as the miniature prints and with the same spacing. When the two aforementioned opposed edges are grasped and squeezed, the front and rear walls bow symmetrically outward while the middle wall, shorter in height than the front and rear walls, provides a precise stop and resistance to further squeezing when its free edge is caused to strike the joined edges of the front and rear walls at their line of attachment. The height of the middle wall is dimensioned to provide for the miniature prints affixed to the inside of the front wall to arrive at the focus of the pair of lenses in the rear wall when the opposed edges are squeezed by the user to their point of resistance. The expanded viewer allows the user to see the same image as appears in the reflection print disposed on the exterior surface of the front wall with more realistic perspective with the eyes relaxed and parallel, without accommodation or convergence being required. Although the bowed structure of the expanded viewer provides a curved field of view, the image is seen to remain sharply in focus over its field of view.

Accordingly, one object of the present invention is to provide a standard-sized reflection print with an integral and expandable binocular viewer attached to the print for viewing the same image (or another image) at the user's convenience.

Still another object of the present invention is to provide more realism to the viewing experience by improving perspective and reducing eye strain.

Yet another object of the present invention is to provide for stereoscopic viewing of an image.

A further object of the present invention is to provide a binocular viewer that collapses to a very thin flat profile whereby a plurality of reflection prints occupies a small volume.

Another object of the present invention is to provide a means of automatically and correctly focusing optical lenses for viewing of the image.

Yet another object of the present invention is to provide an expanded binocular viewer shaped to a profile that can be easily held close to the user's eyes without interference with the user's nose.

Another object of the present invention is to provide a reflection print having an integral and expandable binocular viewer that requires no user assembly.

Yet another object of the present invention is to provide a binocular viewer whose method of expansion is intuitively obvious.

Still another object of the present invention is to provide a collapsible binocular viewer which is inexpensive and simple in structure so as to become an integral part of each reflection print.

These and other aspects, objects, features, and advantages of the present invention will be more clearly understood and appreciated from a review of the following detailed description of the preferred embodiments and appended claims, and by reference to the accompanying drawings. The invention is defined by the appended claims.

ADVANTAGEOUS EFFECT OF THE INVENTION

The present invention provides a convenient, compact, and simple viewer for viewing images with greater realism. The viewer collapses to a slim profile and does not require any user assembly. The reflection print integral with the viewer permits the user to preview the image and decide whether to view it with the viewer to improve its depth perspective. The collapsible viewer is relatively inexpensive to manufacture, simple and convenient to use, and provides to the user a message or image while in collapsed form.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIGS. 7(a)–7(c) show three perspective side views of the viewer in various stages of expansion through the compression of the opposed edges; FIG. 7(a) shows the collapsed form and FIG. 7(c) shows the expanded form.

DETAILED DESCRIPTION OF THE INVENTION

The following is a detailed description of the preferred embodiments of the invention, reference being made to the drawings in which the same reference numerals identify the same elements of structure in each of the several figures.

While the present invention is amenable to various modifications and alternative constructions, the embodiments shown in the drawings will herein be described in detail. It is understood, however, it is not the intention to limit the invention to the particular forms disclosed, but to the contrary, the intention is to cover all modifications, equivalencies, and alternative constructions falling within the spirit and scope of the invention as expressed in the appended claims.

Figure 1:
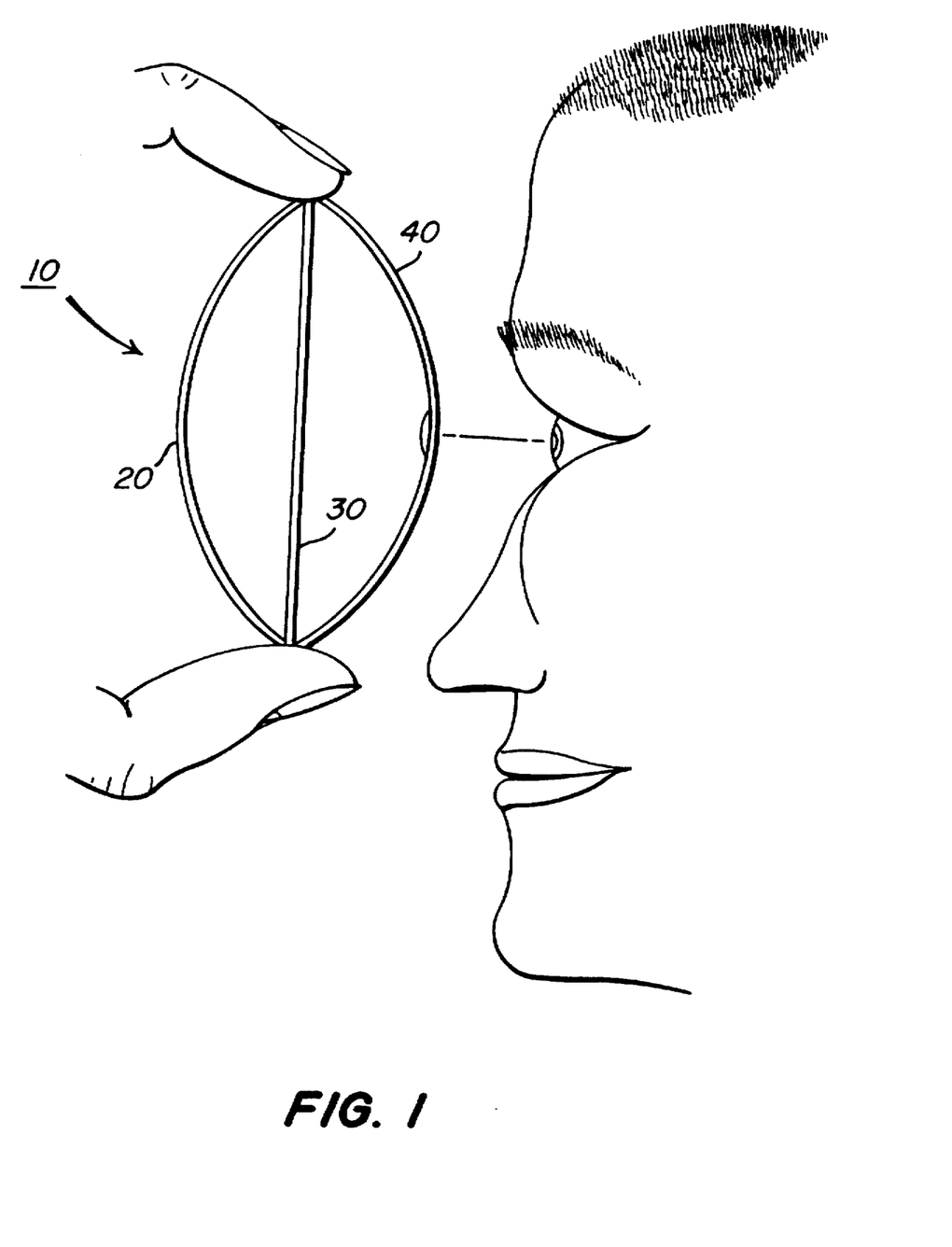
FIG. 1 shows a side view the binocular viewer in accordance with the present invention with the viewer in an expanded form and being held by the user.
Figure 2A:
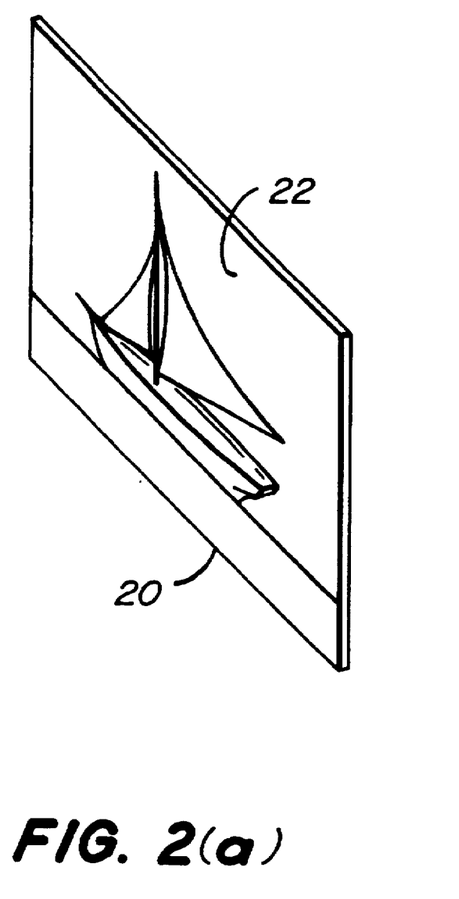
FIGS. 2(a) and 2(b) show a perspective view of the exterior and interior surface, respectively, of the front wall.
Figure 2B:
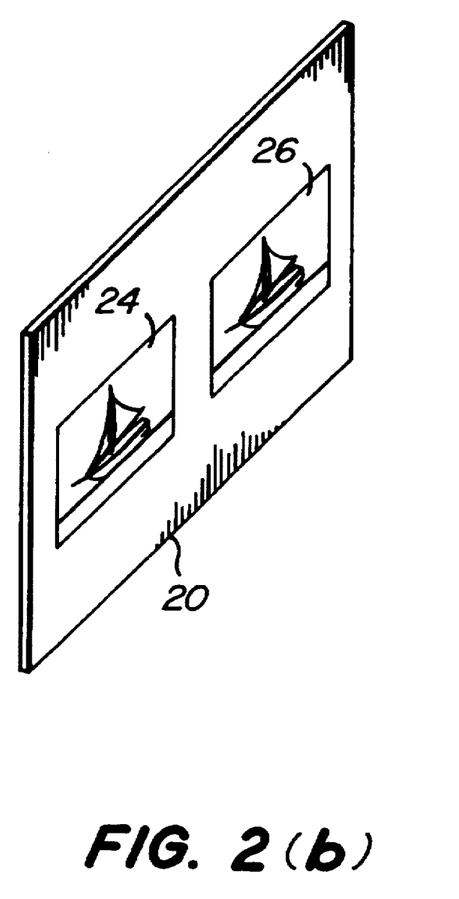

A collapsible binocular viewer 10 in accordance with the present invention is generally illustrated in FIG. 1, as it is held by a user. Viewer 10 is comprised of three walls, a front wall 20, a middle wall 30, and a rear wall 40. FIGS. 2(a) and 2(b), respectively, illustrated perspective views of an exterior surface and interior surface of front wall 20 in a relaxed (i.e., non-flexed) state. FIG. 2(a) shows the exterior surface of front wall 20 as having an image 22 covering substantially the entire exterior surface to constitute a reflection print of standard size, typically 3½" in height by 5" in length (generally known as 3R prints) or 4" in height by 6" in length (generally known as 4R prints), with the greater dimension oriented to the horizontal. Front wall 20 is formed of flexible, but semi-rigid, material such as paper, plastic-coated paper, plastic, or cardboard. The interior surface of front wall 20 supports a left image 24, positioned to the left side of front wall 20 and a right image 26 positioned to the right side of front wall 20. Left and right images 24 and 26 may constitute a stereo pair that provide a sense of depth when viewed stereoscopically or images 24,26 may be identical. In either situation, images 24,26 are viewed in a manner that greatly improves the viewing experience. The center-to-center spacing of left and right images 24,26 is typically 65 mm, the average interocular separation for human eyes. The images are positioned so as to be centered with the height and length of the wall as shown in FIG. 2(b). Left and right images 24,26 are reflection prints viewed by reflected ambient light. The size of images 24,26 (referred to also as miniature reflection prints) may typically be 24 mm in height and 36 mm in length. Such reflection prints can be obtained, for example, by contact printing 35 mm color-negative film to color-negative paper or 35 mm reversal slide film to color-reversal paper.

Image 22 disposed on the exterior surface of front wall 20 can be representative of images 24,26, thereby providing the user with a reflection print which can be viewed to decide whether images 24,26 should be viewed with the binocular viewer. Image 22 may include text or other characters.

Figure 3A:
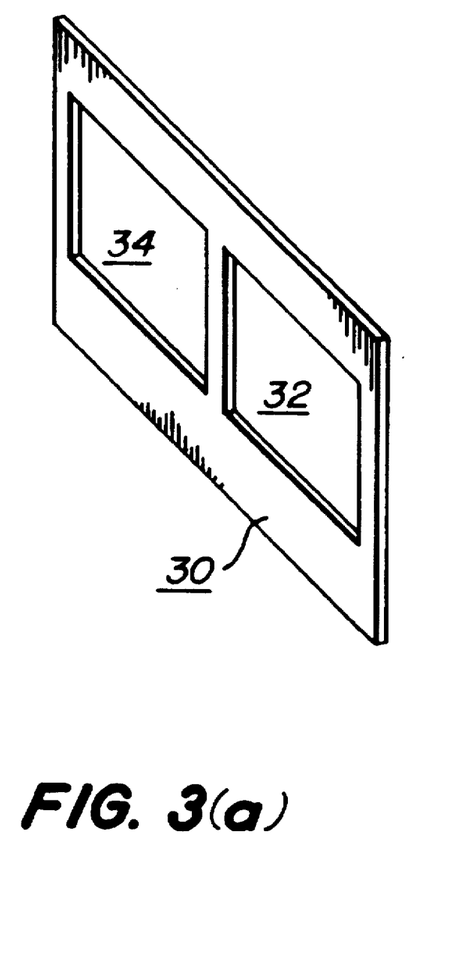
FIGS. 3(a) and 3(b) show a perspective view of the front and back surface, respectively, of the middle wall.
Figure 3B:
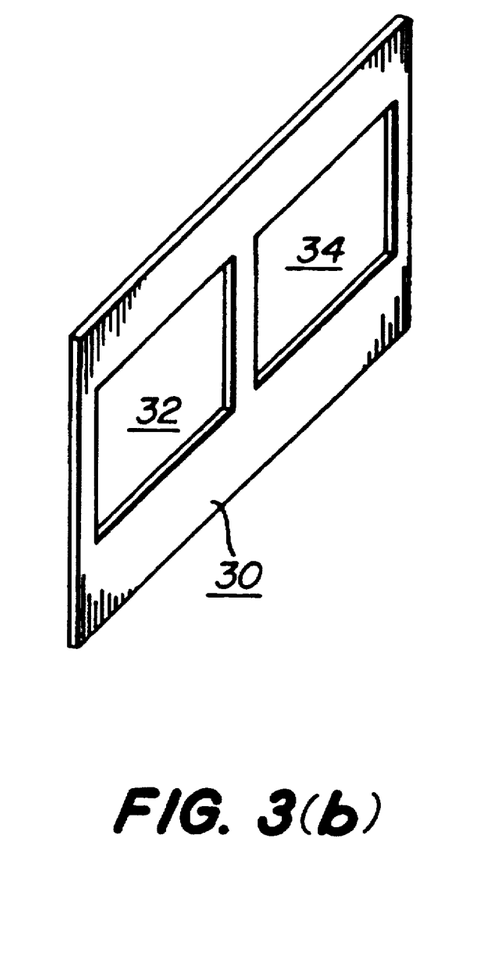

The front and back perspective views of middle wall 30 are shown, respectively, in FIGS. 3(a) and 3(b). The middle wall has left and right open frames 32,34, respectively, of length and width dimensions comparable to the dimensions of the miniature reflection prints. Frames 32 and 34 are also centered in wall 30 in an similar manner as images 24 and 26 are centered in wall 20. When binocular viewer 10 is fully expanded, frames 32 and 34 are in spatial alignment (e.g., optical registration) with images 24 and 26, respectively. Middle wall 30 is not intended to flex as freely as front and rear walls 20,40. Consequently, middle wall 30 can be comprised of the material used for the front wall but having a greater thickness, or alternatively, middle wall can be comprised of a material which is stiffer than front wall 20. Preferably the material of which the middle wall is formed is not opaque, but rather, optically transparent or translucent so as to readily admit ambient light to illuminate the miniature reflection prints. The length of middle wall 30 is typically substantially the same as the length of front wall 20. The height of middle wall 30 is less than the height of the front and rear walls that have substantially equal height and length. The reduced height of the middle wall accommodates compression and bowing of the front and rear walls, yet limits such bowing to bring images 24,26 into a relaxed focus to the user's eyes.

Figure 4A:
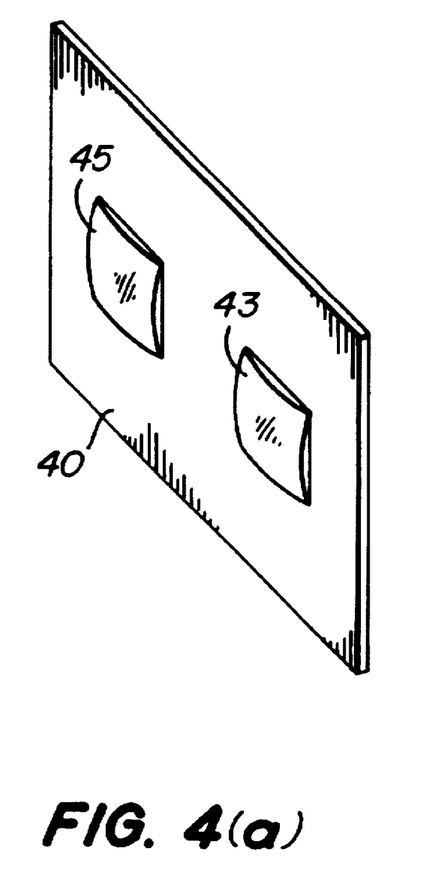
FIGS. 4(a) and 4(b) show a perspective view of the interior and exterior surface, respectively, of the rear wall.
Figure 4B:
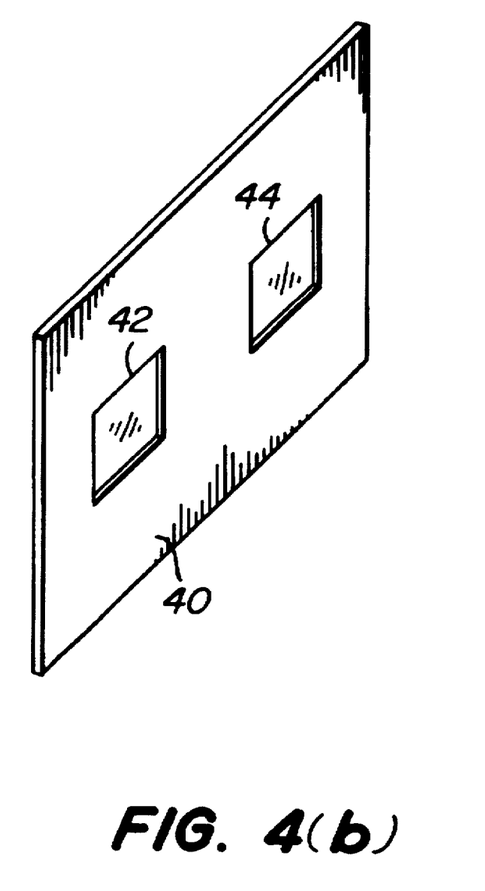

A perspective view of an interior and exterior surface of back wall 40 is shown, respectively, in FIG. 4(a) and FIG. 4(b). Back wall 40 includes left and right openings 42 and 44 having affixed thereto, respectively, identical optical lenses 43 and 45 of positive optical power. Openings 42,44 and affixed lenses 43,45 may be circular, square, or rectangular with a minimum shortest dimension being typically 10 mm. Openings 42 and 44 are centered in back wall 40 in a similar manner as images 24 and 26 are centered in front wall 20. As such, openings 42,44 are in optical registration with images 24,26. When viewer 10 is fully expanded (i.e., a viewing condition), lenses 43,45 are positioned approximately one focal length from images 24,26 to allow the user's eyes to be relaxed to infinity. Lenses 43,45 are preferably plano-convex, with the plano surface directed to the exterior of back wall 40. Lenses 43,45 may also employ diffractive optics or a gradient index to either reduce their thickness or surface curvature. Back wall 40 is preferably comprised of transparent or translucent material that readily admits ambient light to illuminate images 24,26.

Figure 5:
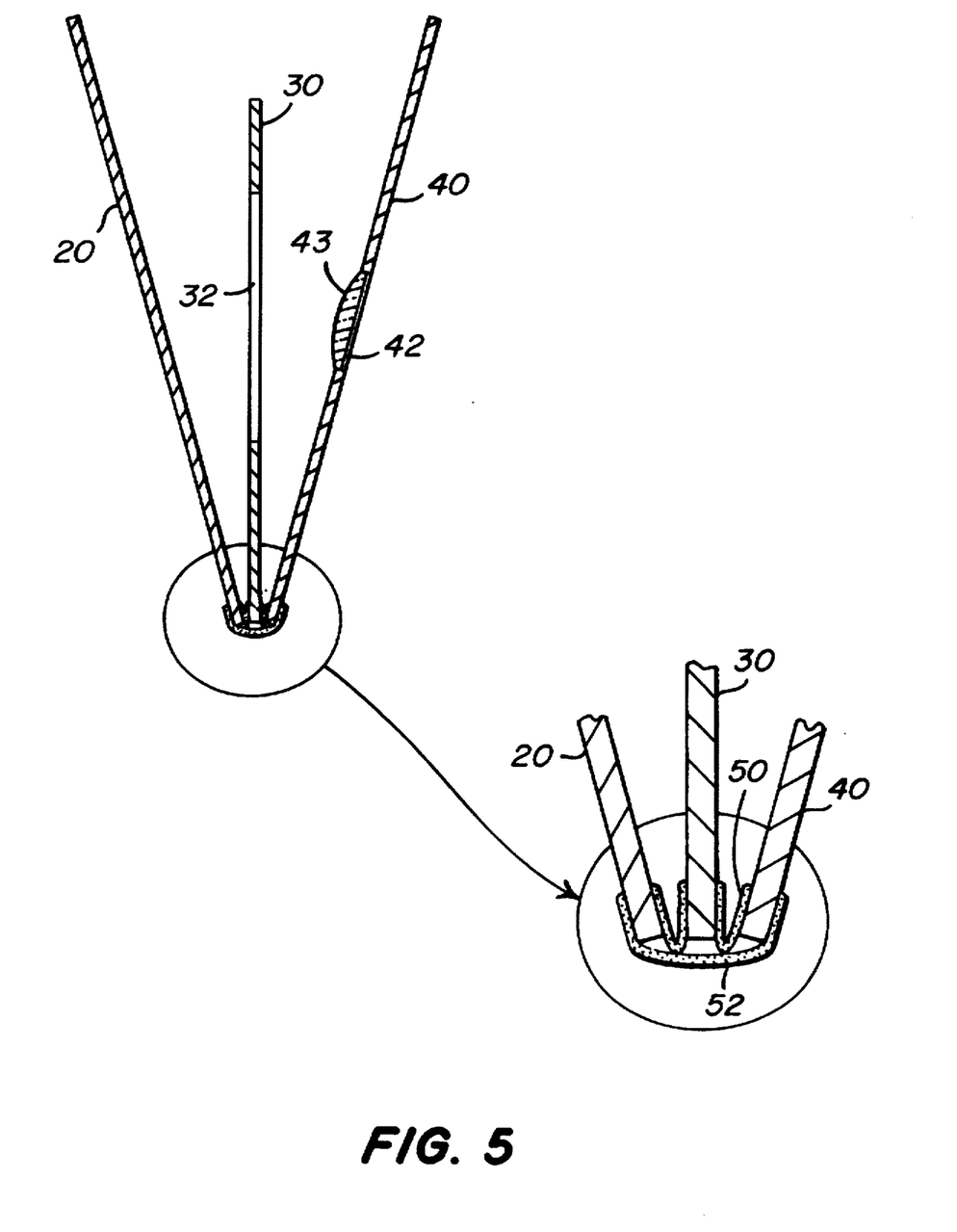
FIG. 5 shows a side view of the viewer during assembly of the three walls at their bottom edges.
Figure 6:
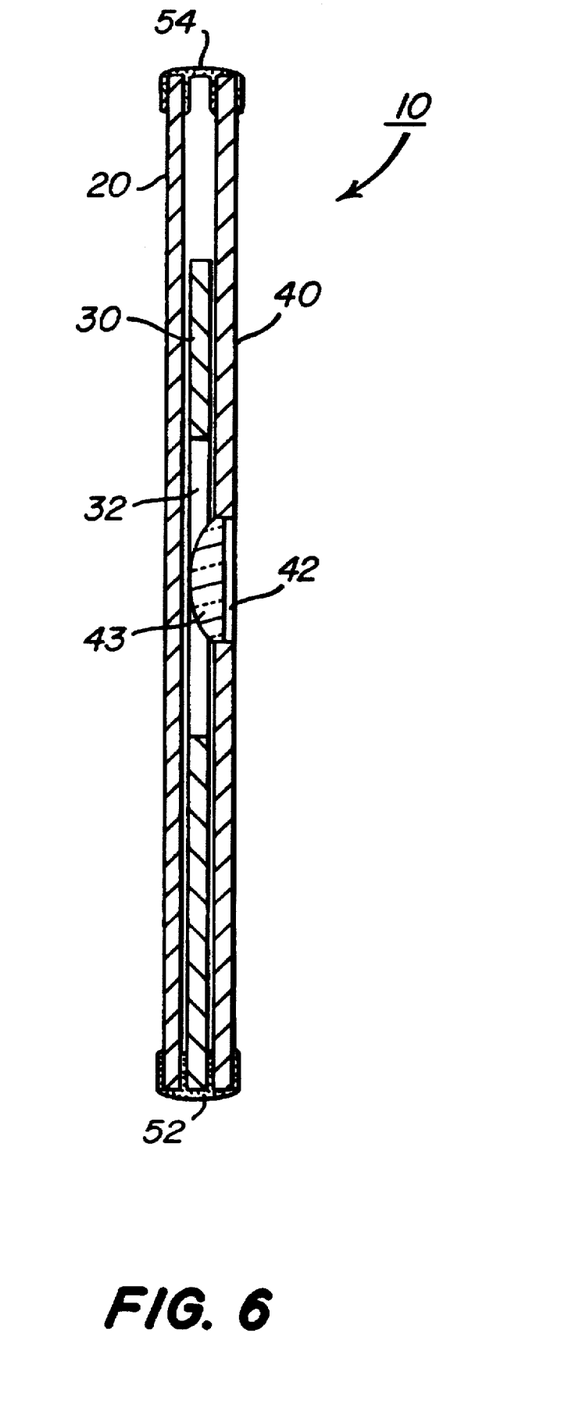
FIG. 6 shows a cross-sectional view of the fully assembled viewer in the collapsed form taken along line 6—6 of FIG. 7(a).
Figures 7A, 7B, 7C:
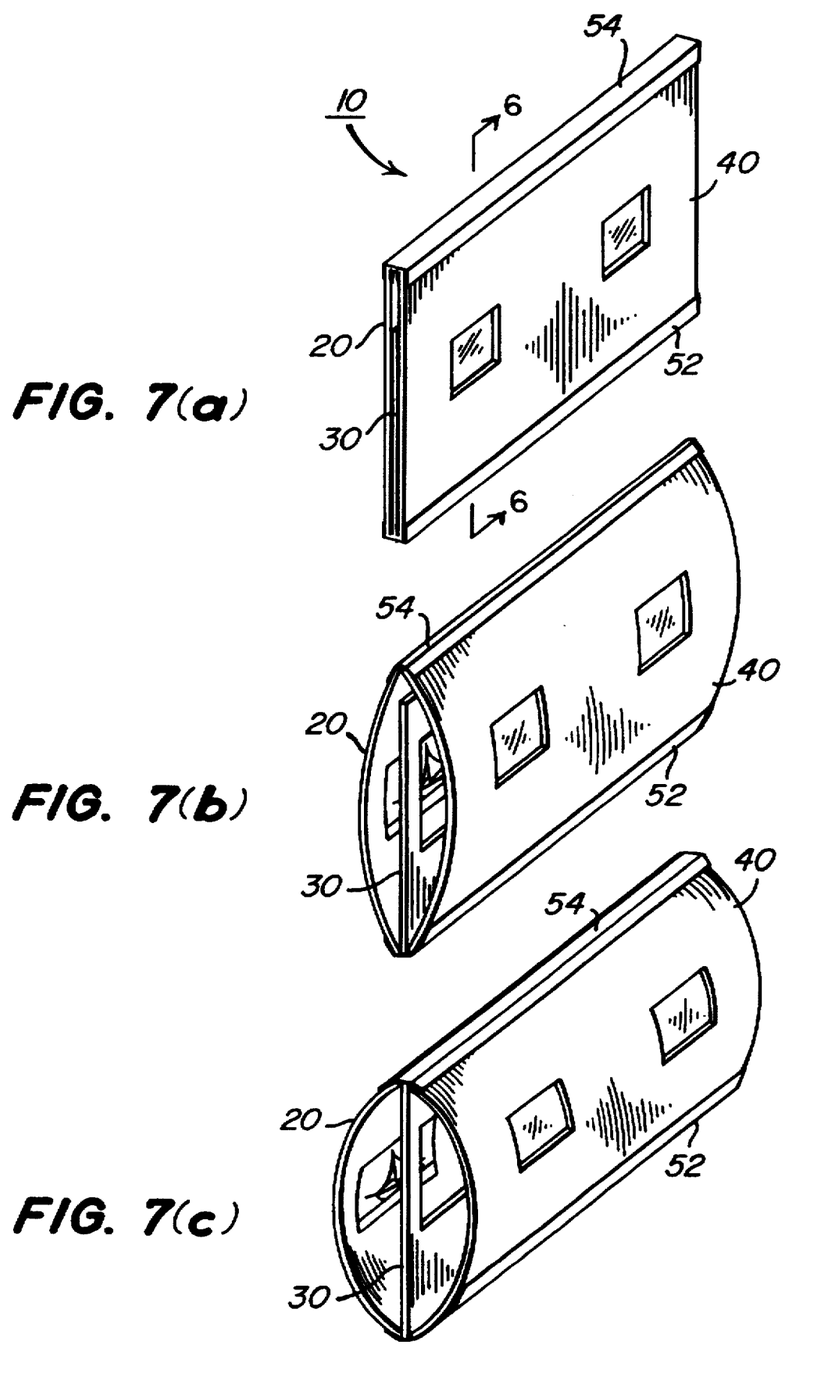

A partial assembly of viewer 10 is shown in FIG. 5. To assemble, middle wall 30 is attached to back wall 40 at their bottom edges by attachment means, for example by a narrow strip of adhesive tape 50. An exploded view better shows the attachment at the bottom edges. A bottom edge of front wall 20 is then attached to the bottom edges of attached middle and back walls 30, 40, for example by a narrow strip of adhesive tape 52. A suitable adhesive tape is both strongly adherent and readily flexible. Applicants have noted that a cloth-type adhesive tape performs well. Referring now to FIG. 6, a top edge of front and back walls 20,40 are then brought into contact and attached, for example by a narrow strip of adhesive tape 54. As illustrated in FIG. 6, since middle wall 30 is of a reduced height, middle wall 30 is not attached to the attached top edges of front and rear walls 20,40. FIG. 6 shows that, in the fully collapsed form, a portion of lenses 43,45 may protrude into open frames 32,34 of middle wall 30, which aides in reducing the thickness of the viewer in the collapsed form. As illustrated in FIG. 6, in this collapsed form, the interior surfaces of front wall 20 and rear wall 40 abut middle wall 30.

The expansion of viewer 10 into a binocular viewer to permit viewing is accomplished by symmetrically bowing front and rear walls 20,40 to define convex curves. As shown in FIG. 1 and FIGS. 7(a), 7(b), and 7(c), the bowing is performed by a user's fingers compressing opposed edges of the viewer until resistance is felt when the upper edge of middle wall 30 contacts the joined upper edges of the front and rear walls. When the compressive force of the fingers is removed, front and rear walls 20,40 return to a relaxed position whereby the viewer is returned to a flattened profile. A typical thickness of such a constructed viewer (including lenses) may be approximately 1.5 mm.

Viewer 10 is not limited to a rectangular shape. For greeting cards and advertising promotions, the viewer's shape may totally or partially assume any number of forms, for example, a Valentine heart, a birthday or wedding cake, an automobile, or a movie character.

Although the pair of images 24,26 are usually stereoscopic pairs, it should be understood that the pair of images do not need to be left and right images of a stereo pair. Rather, the images can be identical in which case the user enjoys seeing a magnified image that presents a larger field of view and therefore improved depth perspective. The ability to view an image with a perspective that is closer to reality than afforded by viewing standard 3R or 4R prints at 12–16", offers a greater sense of depth, realism, and viewing pleasure.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 print with integral stereo viewer
20 front wall 22 image; reflection print
24 left image; miniature reflection print
26 right image; miniature reflection print
30 middle wall
32 left open frame
34 right open frame
40 rear wall
42 left opening
43 left lens
44 right opening
45 right lens
50 attachment means; adhesive; tape
52 attachment means; adhesive; tape
54 attachment means; adhesive; tape

What is claimed is:

1. A collapsible viewer, comprising:
   a front and rear planar wall comprised of a flexible material, each front and rear wall having a top edge, a bottom edge, two side edges, an interior surface, and an exterior surface, the front and rear walls joined at the top and bottom edges and not joined at the two side edges, the front wall including a pair of images disposed on the interior surface of the front wall, the rear wall including a pair of viewing apertures having lenses in optical registration with the pair of images; and
   a middle wall disposed intermediate the front and rear wall and affixed to the bottom edge of the front or rear wall, the middle wall having at least one aperture, the front and rear walls movable between (i) a viewing condition wherein the front and rear walls flex to define opposed convex curves and the pair of images are viewable through the pair of viewing apertures and (ii) a collapsed condition wherein the interior surfaces of the front and rear walls abut the middle wall.

2. The collapsible viewer according to claim 1 wherein the viewing condition is accomplished by the application of pressure to the top and bottom edges of the front and rear walls.

3. The collapsible viewer according to claim 1 further comprising an image disposed on the exterior surface of the front wall representative of the pair of images disposed on the interior surface.

4. The collapsible viewer according to claim 1 wherein the at least one aperture of the middle wall is in optical registration with the pair of images when the front and rear walls are in the viewing condition.

5. The collapsible viewer according to claim 4 wherein the middle wall includes a pair of apertures adapted to be in optical registration with the pair of images when the front and rear walls are in the viewing condition.

6. The collapsible viewer according to claim 1 wherein the front and rear walls have a first height, and the middle wall has a second height less than the first height.

7. The collapsible viewer according to claim 6 wherein the second height limits the convex curvature of the front and rear walls when the front and rear wall are in the viewing condition.

8. The collapsible viewer according to claim 1 wherein the viewing apertures are disposed one focal length from the pair of images when the front and rear walls are in the viewing condition.

9. The collapsible viewer according to claim 1 wherein the front, middle, and rear walls have a thickness, and the collapsed condition defines a plane having a thickness approximately equal to a sum of the thicknesses of the front, middle, and rear walls.

10. The collapsible viewer according to claim 1 wherein the front and rear walls have a first stiffness, and the middle wall has a second stiffness which is stiffer than the first stiffness.

11. The collapsible viewer according to claim 1 wherein the rear wall is comprised of a material which is not opaque.

12. The collapsible viewer according to claim 1 wherein the middle wall is comprised of a material which is not opaque.

13. The collapsible viewer according to claim 3 wherein the image disposed on the exterior surface of the front wall is a reflection print.

14. The collapsible viewer according to claim 1 wherein the pair of images disposed on the interior surface of the front wall are reflection prints.

15. The collapsible viewer according to claim 14 wherein the pair of images disposed on the interior surface of the front wall are a stereo pair of reflection prints.

16. The collapsible viewer according to claim 14 wherein the pair of images disposed on the interior surface of the front wall are an identical pair of reflection prints.

17. A collapsible viewer, comprising:
    a front and rear planar wall comprised of a flexible material, each front and rear wall having a top edge, a bottom edge, and two side edges, the front and rear walls joined at the top and bottom edges and not joined at the two side edges, the front wall adapted to receive and support a pair of images, the rear wall including a pair of viewing apertures having lenses in optical registration with the pair of images; and
    a middle wall disposed intermediate the front and rear wall and affixed to the bottom edge of the front or rear wall, the middle wall having at least one aperture, the front and rear walls movable between (i) a viewing condition wherein the front and rear walls flex to define opposed convex curves and the pair of images are viewable through the pair of viewing apertures and (ii) a collapsed condition wherein the front and rear walls abut the middle wall.

* * * * *